Figure 1:
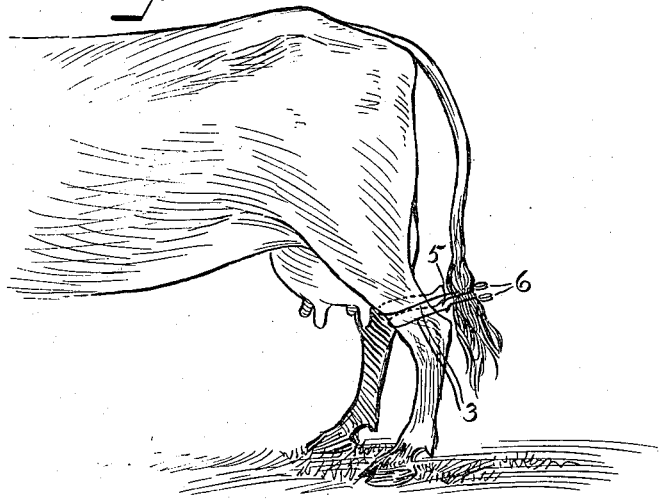

N. P. BENGSTON.
COW TAIL HOLDER.
APPLICATION FILED SEPT. 12, 1914.

1,136,395.

Patented Apr. 20, 1915.

Witnesses
S. H. Clarke
L. L. Markel

Inventor
N. P. Bengston
By Hestt Sutherland
Atty.

UNITED STATES PATENT OFFICE.

NELS P. BENGSTON, OF PLAINVILLE, CONNECTICUT.

COW-TAIL HOLDER.

1,136,395.   Specification of Letters Patent.   Patented Apr. 20, 1915.

Application filed September 12, 1914. Serial No. 861,341.

*To all whom it may concern:*

Be it known that I, NELS P. BENGSTON, a citizen of the United States, residing at Plainville, in the county of Hartford and State of Connecticut, have invented certain new and useful Improvements in Cow-Tail Holders, of which the following is a specification.

This invention relates to cow-tail holders, the object of the invention being to provide a device of this character which is simple in construction, inexpensive to make, which can be readily applied to and removed from a cow, and which when in operative position causes the animal practically no inconvenience or annoyance, but which will effectually prevent her switching her tail into the face of a milker.

In the drawings accompanying and forming part of the present specification I have shown in detail one of the several convenient forms of embodiment of the invention, which to enable those skilled in the art to practice the same will be set forth fully in the following description. I do not restrict myself to this particular disclosure; I may depart therefrom in several respects within the scope of the invention defined by the claim following said description.

Figure 2:
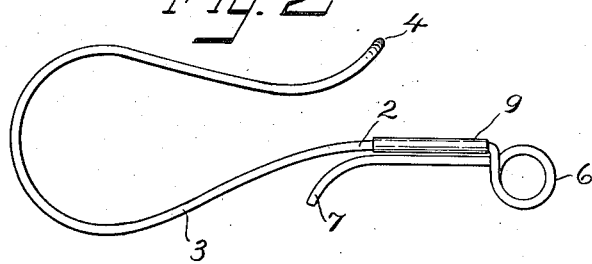
Figure 3:
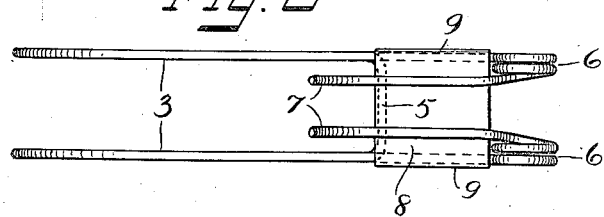

Referring to said drawings: Figure 1 is a perspective view of portion of a cow showing the device mounted in operative position and as holding her tail. Fig. 2 is a top plan view of the article. Fig. 3 is a side elevation of the same.

Like characters refer to like parts throughout the several views, the device being shown on a small scale in Fig. 1.

The cow-tail holder may be made of any suitable material, although it can be best made of wire; as a matter of fact it can practically be made in one piece thereof. As shown the holder comprises a shank or body portion as 2 which is practically straight and to which is connected one terminal of the hook 3, the bill 4 of which is outturned. This hook 3 is resilient and is intended to yieldingly grip one of the hind legs of the cow, for instance just above the gambrel-joint as shown in Fig. 1. The shank or body portion 2 and the hook 3 comprise as will be seen on reference to Fig. 3, side pieces or branches disposed in parallelism, they being connected at the bill 4 by the transverse portion 5. The branches or sides of the shank or body portion 2 are provided with coiled springs 6 opposite each other and from the inner coils of which the mating projections 7 extend, these projections or arms 7 overlying and approximately engaging the outer surface of a bearing member as the plate 8 which as shown has sleeves 9 tightly fitting the branches of the shank or body portion 2, the outer edge of the plate fitting approximately against the torsion springs 6 which exert a constant tendency to hold the projections or arms 7 contiguous to the plate 8. Said plate acts to tie together the sides of the shank 2 preventing said sides from moving toward or from each other. The free ends of these arms 7 which present collectively a clamping or gripping member, are bowed outward to facilitate the introduction of the fingers between said free ends and the adjacent portion of the hook or shank 3 for the purpose of swinging said arms 7 outward.

In use the open side of the hook 3 will be placed against the front of a hind leg at about the point mentioned and said hook will be thrust rearward so that it can be opened sufficiently to receive the leg, the motion continuing until the front of the leg has bottomed against the closed side of the hook at which time the hook will yieldingly embrace the leg to an extent sufficient to prevent accidental displacement of the holder from position. When this is done the two arms 7 will be swung outward by the milker and the tip of the tail laid against the plate 8 between said plate and arm 7, after which said arms will be freed and will be caused to press the tail solidly and substantially against the plate 8 which for this purpose offers a wide and ample bearing therefor. As shown the article except for the plate 8 is made in one piece from spring wire of proper gage, and owing to this fact I can secure the necessary resiliency in the hook 3 and the torsion springs 6.

It will be apparent from the foregoing statements, taken in connection with the annexed drawings, that my cow tail holder comprises a hook, the shank and bill of which have approximately parallel sides, a crosspiece connecting the free end of the bill, the sides of the shank having coiled springs at their outer ends, the inner coils of said springs being projected forwardly, the shank being located between said forwardly projected portions and the bill and said forwardly projecting portions being disposed between the sides of the shank, the bill being separated from the shank, the hook, bill, coils and forwardly projected portions being made in one piece from wire, and a plate having sleeves fitted to the sides of the shank, the outer end of the plate being adjacent said coils and said forwardly projected portions being contiguous to the outer face of said plate.

What I claim is:

A cow tail holder comprising a hook, the shank and bill of which have approximately parallel sides, a crosspiece connecting the free end of the bill, the sides of the shank having coiled springs at their outer ends, the inner coils of said springs being projected forwardly, the shank being located between said forwardly projected portions and the bill, and the bill being separated from the shank, the forwardly projected portions being between the sides of the shank and all in one piece, and a plate having sleeves fitted to the sides of the shank, the outer end of the plate being adjacent said coils and said forwardly projected portions being contiguous to the outer surface of said plate, said plate tying together said sides to prevent movement of the latter toward or from each other.

In testimony whereof I affix my signature in presence of two witnesses.

NELS P. BENGSTON.

Witnesses:
HEATH SUTHERLAND,
L. L. MARKEL.